United States Patent
Schmidt

(10) Patent No.: US 6,918,689 B2
(45) Date of Patent: Jul. 19, 2005

(54) PIVOTING AUXILIARY VEHICLE LIGHT ASSEMBLY

(75) Inventor: Keith Jonathan Schmidt, Waterloo, IA (US)

(73) Assignee: Deere & Company, Moline, IL (US)

(*) Notice: Subject to any disclaimer, the term of this patent is extended or adjusted under 35 U.S.C. 154(b) by 60 days.

(21) Appl. No.: 10/621,961

(22) Filed: Jul. 17, 2003

(65) Prior Publication Data

US 2005/0024885 A1 Feb. 3, 2005

(51) Int. Cl.$^7$ .................................................. B60Q 1/00
(52) U.S. Cl. ....................... 362/485; 362/402; 362/427; 403/83
(58) Field of Search ................................ 362/485, 427, 362/402, 440, 418, 371, 55, 401; 285/223, 224; 403/83, 84, 91–96, 103, 104, 365–367

(56) References Cited

U.S. PATENT DOCUMENTS

| 4,160,536 | A | * | 7/1979 | Krogsrud | 248/280.11 |
| 5,149,149 | A | * | 9/1992 | Wu | 285/402 |
| 5,170,975 | A | * | 12/1992 | Chadwick | 248/284.1 |

FOREIGN PATENT DOCUMENTS

| DE | 33 27 588 A1 | 2/1985 |
| EP | 1 114 748 A2 | 11/2001 |
| FR | 2 635 057 | 9/1990 |
| GB | 19278 | 10/1913 |
| JP | 63-207750 | 8/1988 |

* cited by examiner

Primary Examiner—Sandra O'Shea
Assistant Examiner—Guiyoung Lee

(57) ABSTRACT

An auxiliary light assembly is provided for a tractor having a front-mounted implement. The assembly includes a lower support and an upper support pivotal with respect to the lower support. The lower support has a cylindrical member which is attached to a frame. Detent recesses are formed in an upper end surface of the lower support. The upper support has a lamp housing attached to an end of a support rod, and a detent member. The detent member is selectively received by the recesses to releasably hold the upper support in selected positions relative to the lower support. A bushing member is received by the support members to maintain axial alignment thereof. A spring is received by the support members, and is biased to urge the support members towards each other.

13 Claims, 3 Drawing Sheets

PIVOTING AUXILIARY VEHICLE LIGHT ASSEMBLY

BACKGROUND

The present invention relates to an auxiliary light assembly for a vehicle.

Utility tractors have standard front-mounted headlamps to provide illumination in the forward direction. However, front mounted implements, such as a front mounted loader, may interfere with or block the illumination from the headlights, or the material carried by the loader may block the illumination.

SUMMARY

Accordingly, an object of this invention is to provide a vehicle illumination device which is not blocked by front mounted implements or material carried thereby.

These and other objects are achieved by the present invention, wherein an auxiliary light assembly is provided for a tractor having a front-mounted implement. The assembly includes a lower support and an upper support pivotal with respect to the lower support. The lower support has a cylindrical member which is attached to a frame. Detent recesses are formed in an upper end surface of the lower support. The upper support has a lamp housing attached to an end of a support rod, and a detent member. The detent member is selectively received by the recesses to releasably hold the upper support in selected positions relative to the lower support. A bushing member is received by the support members to maintain axial alignment thereof. A spring is received by the support members, and is biased to urge the support members towards each other.

DETAILED DESCRIPTION

Figure 1:
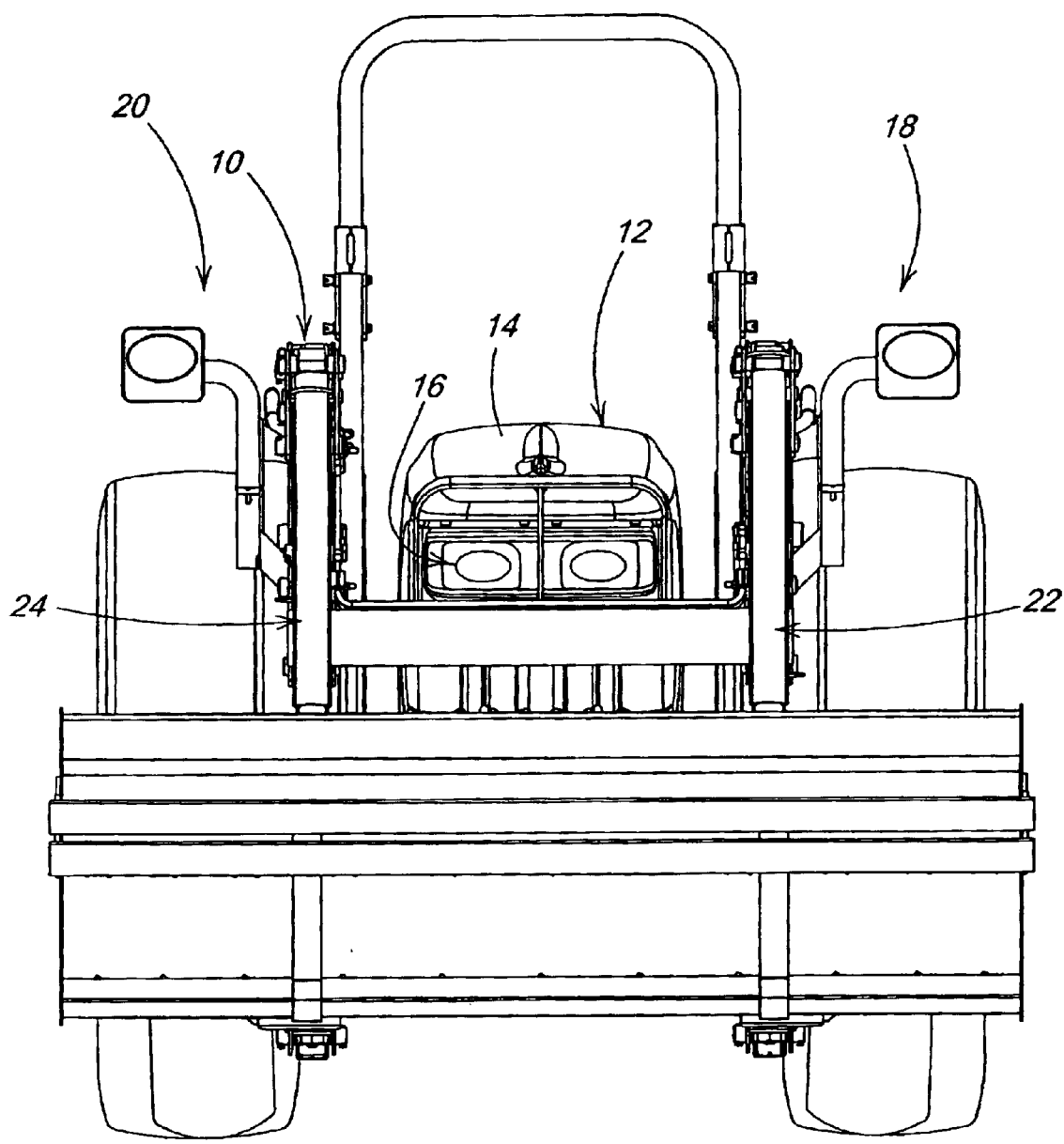
FIG. 1 is a front view of a front of a tractor with the present invention mounted on a loader mechanism.
Figure 2:
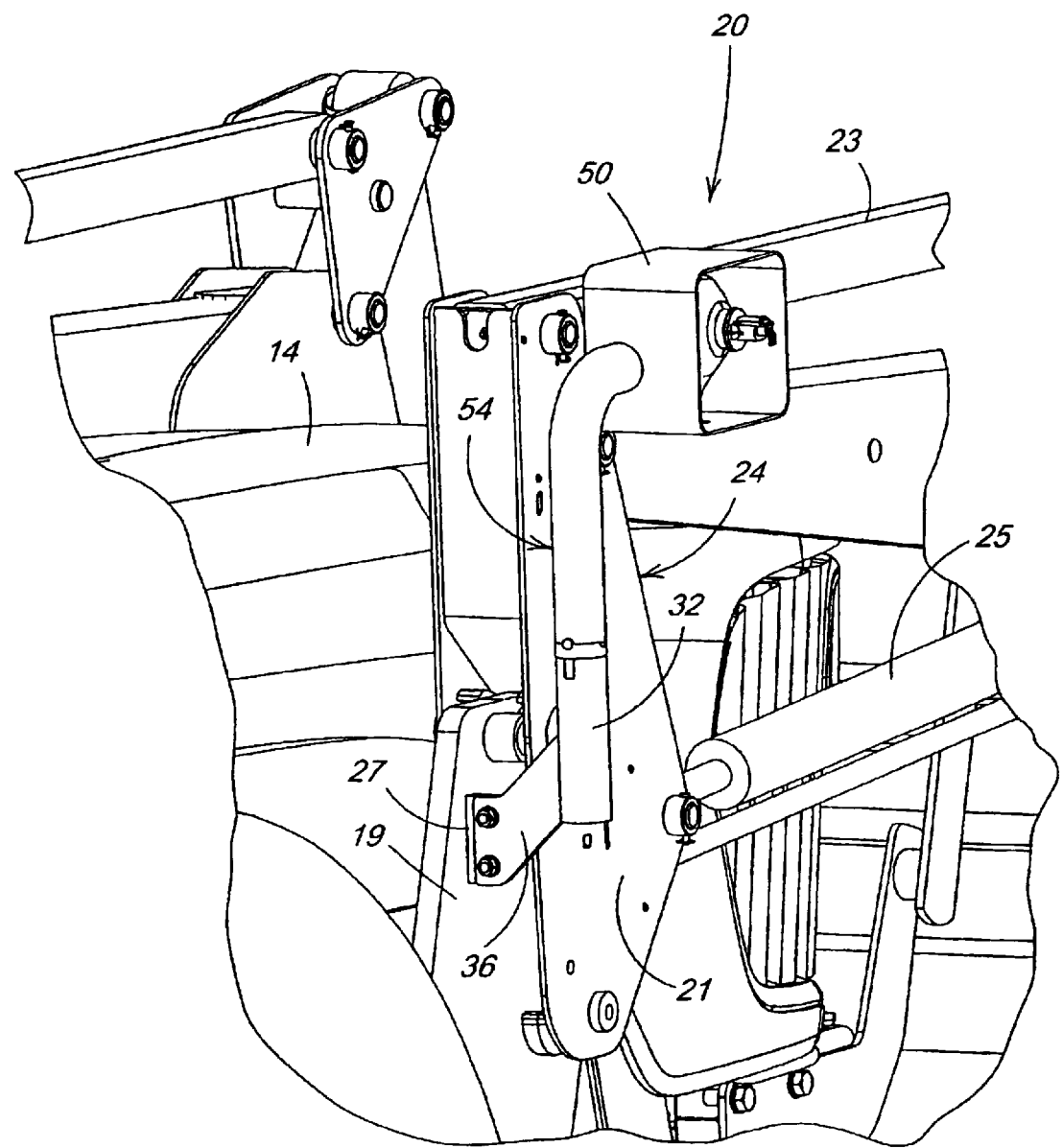
FIG. 2 is a perspective view of the present invention and a portion of the loader mechanism.

Referring to FIGS. 1 and 2, a conventional loader frame 10 is front-mounted to the front of a conventional tractor 12 which has a hood 14 and conventional headlights 16. Left and right auxiliary light assemblies 18 and 20 are mounted on the left and right loader members 22 and 24. As best seen in FIG. 2, the loader member 24 includes a frame 19 which supports a mast 21 which in turn supports a conventional boom 23 and cylinder 25. The frame 19 is attached by conventional means to an axle housing (not shown) of the tractor 12. A plate 27 is welded to the side of frame 19.

Figure 3:
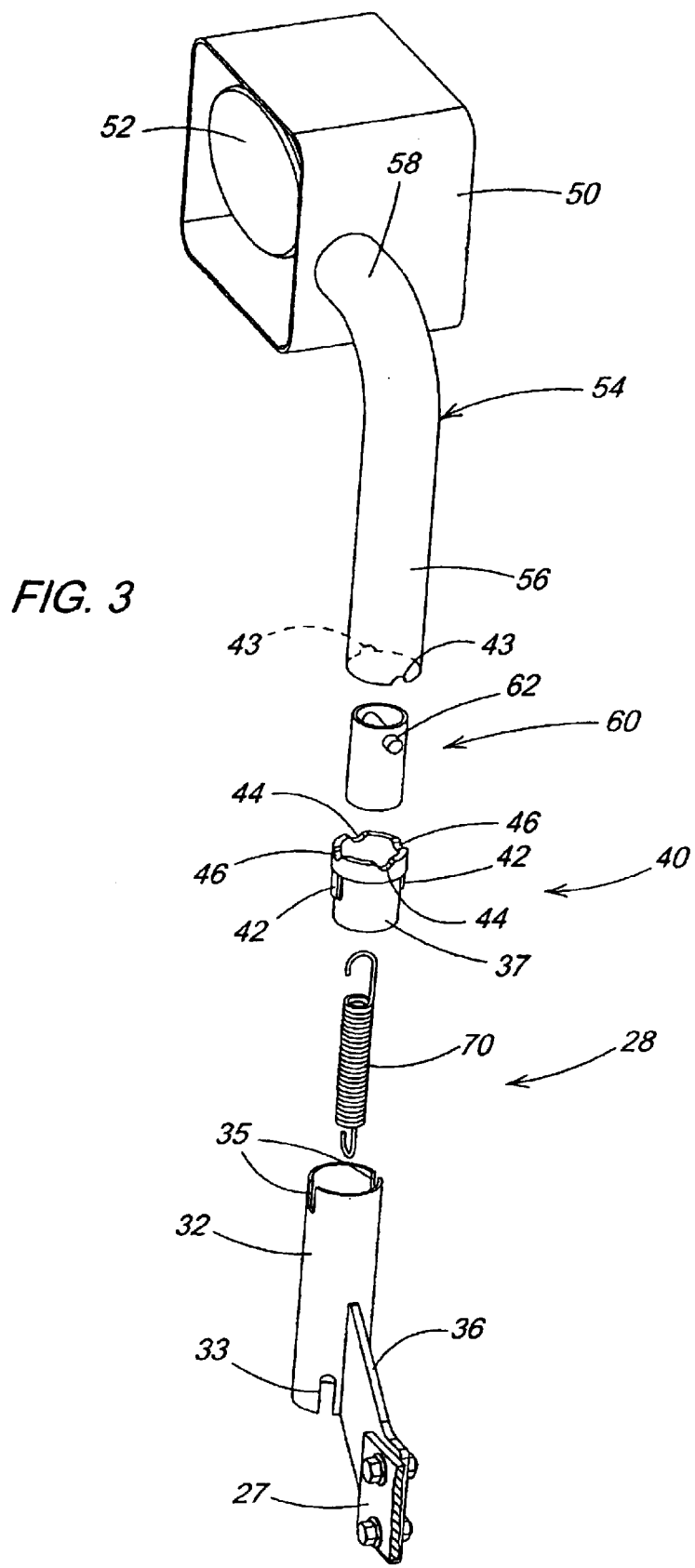
FIG. 3 is an exploded view of the present invention.

Referring now to FIGS. 2 and 3, each light assembly 18, 20 includes a lower support 28. Lower support 28 includes a hollow cylindrical tube 32, a plate 36 and a hollow cylindrical retainer 40. Plate 36 is attached, such as by bolts, to plate 27. A pair of alignment slots 35 are formed in the upper end of tube 32. A spring anchor slot 33 is formed in the lower end of tube 32.

Retainer 40 is partially received in the upper end of tube 32. Retainer 40 has a lower smaller diameter shaft 37 and an upper larger diameter rim 39. Retainer 40 has a pair of tabs 42 which are received in the alignment slots 35. The shaft 37 of retainer 40 is preferably press-fit into the upper end of tube 32. Two pairs of alignment recesses 44 and 46 are formed in an annular axially and upwardly facing end surface of rim 39.

An upper support includes rectangular frame 50 and a hollow support rod 54. Frame 50 holds a commercially available electric light 52. Rod 54 has a vertical portion 56 and an upper end 58 which bends horizontally and is fixed to a side of frame 50. An alignment tube or bushing 60 is received by and projects from a lower end of rod 54 and is preferably welded to rod 54. Bushing 60 receives a pin or detent member 62 which projects radially outwardly from the outer peripheral surface of the lower end of rod 54. The outer ends of pin 62 are received by recesses 43 in the lower end of rod 54. The outer ends of pin 62 are selectively receivable by recess pairs 44 or 46. Thus, the pin 62 and recess pairs 44 and 46 form a detent device which releasably holds the upper support in selected positions relative to the lower support. The bushing 60 is received by the tube 32 and the rod 54 to maintain axial alignment thereof.

A spring 70 is received in rod 54, tube 32 and retainer 40. Spring 70 has a lower end coupled or hooked to slot 33 in the lower end of tube 32, and spring 70 has an upper end coupled or anchored to pin 62. Spring 70 is biased to urge rod 54 towards tube 32.

As shown by FIGS. 1 and 3, spring 70 releasably holds the frame 50 and rod 54 in a position wherein pin 62 is received by recesses 44 and wherein light 52 provides illumination in the forward direction. Spring 7 also releasably holds the frame 50 and rod 54 in a retracted position shown in FIG. 2 wherein pin or bolt 62 is received by recesses 46 and wherein housing 50 and light 52 are held close to the side of the loader mast 21.

The light assemblies 18 and 20 provide effective forward lighting for tractors with attached loaders. The upper portion of each assembly is retractable, so it can be swung forward when not being used or when the tractor is in tight spaces. Each assembly is spring loaded and has a "break away" design which will deflect in the event the assembly hits an object. The light assemblies 18 and 20 do not obstruct visibility of the tires, of the forward view, or of the loader bucket. The light assemblies 18 and 20 can be used with new vehicles and with vehicles which are no longer in production.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An auxiliary light assembly for a tractor having an implement mounted thereon, the assembly comprising:

a lower support having a plate for attaching to a frame, a hollow cylindrical tube member attached to the plate;

an upper support comprising a housing for holding a lighting device and a support rod member extending from the housing, the rod member being pivotally coupled to the tube member and pivotal about a vertical axis;

a detent device for releasably holding the upper support in selected positions relative to the lower support, the detent device comprises at least two positions formed in an end of one of the upper and lower support, and the other of the upper and lower support having a detent member which is selectively receivable by the recesses; and a spring received by and coupled between the tube and rod members and biases to urge the tube and rod member towards each other.

2. The auxiliary light assembly of claim 1, wherein:

a lower support comprises a hollow cylindrical retainer fixed in an upper end of the tube member, the retainer having a plurality of recesses formed in an upper surface thereof, and the rod receiving a pin which is selectively receivable by the recesses.

3. The auxiliary light assembly of claim 2, wherein:

a bushing member is received by the tube and rod members to maintain axial alignment thereof, the bushing receiving the pin.

4. The auxiliary light assembly of claim 1, wherein:

a bushing member is received by the tube and rod members to maintain axial alignment thereof.

5. The auxiliary light assembly of claim 1, wherein:

a hollow cylindrical retainer having a smaller diameter shaft received in an upper end of the tube member and having a larger diameter rim which engages an end of the tube member, the retainer rotatably receiving a bushing which projects from the rod.

6. The auxiliary light assembly of claim 5, wherein:

a plurality of recesses are formed in an end of the rim; and the rod carries a detent member which is selectively receivable by said recesses to releasably hold the upper support in selected orientations with respect to the lower support.

7. The auxiliary light assembly of claim 6, wherein:

the spring is received by the tube member, the rod member and the retainer.

8. The auxiliary light assembly of claim 1, wherein:

the rod member has a vertical portion and an upper end which bends horizontally and is fixed to a side of the housing.

9. An auxiliary light assembly for a tractor having an implement mounted thereon, the assembly comprising:

a lower support having a plate for attaching to a frame, a hollow cylindrical tube member connected to the plate, and a hollow cylindrical retainer fixed in an upper end of the tube member, the retainer recesses formed in an upper surface thereof;

an upper support comprising a housing for holding a lighting device, a support rod member extending from the housing, and a detent member, the rod member being pivotally coupled to the tube member and pivotal about a vertical axis, and the detent member being receivable by said recesses to releasably hold the upper support in selected positions relative to the lower support; and a spring coupled between the tube and rod members, the spring being received by the tube member and the rod member, and being biased to urge the tube and rod members towards each other.

10. The auxiliary light assembly of claim 9, further comprising:

a bushing member received by the tube and rod members to maintain axial alignment thereof, the bushing being held in the rod member by the detent member.

11. The auxiliary light assembly of claim 9, further comprising:

a bushing member received by the tube and rod members to maintain axial alignment thereof, the bushing being held in the rod member by the detent member; and a hollow cylindrical retainer having a smaller diameter shaft received in an upper end of the tube member and having a larger diameter rim which engages an end of the tube member, the retainer rotatably receiving the bushing.

12. The auxiliary light assembly of claim 11, wherein:

two pairs of recesses are formed in an end of the rim, said recesses selectively receiving the detent member to releasably hold the upper support in a desired orientation with respect to the lower support.

13. The auxiliary light assembly of claim 9 wherein:

the rod member has a vertical portion and an upper end which bends horizontally and is fixed to a side of the housing.

* * * * *